US008720196B2

(12) United States Patent
Kawasaki et al.

(10) Patent No.: US 8,720,196 B2
(45) Date of Patent: May 13, 2014

(54) CONTROLLER OF HYBRID CONSTRUCTION MACHINE

(75) Inventors: Haruhiko Kawasaki, Tokyo (JP); Masahiro Egawa, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 706 days.

(21) Appl. No.: 12/994,306

(22) PCT Filed: May 13, 2009

(86) PCT No.: PCT/JP2009/058893
§ 371 (c)(1), (2), (4) Date: Nov. 23, 2010

(87) PCT Pub. No.: WO2009/145054
PCT Pub. Date: Dec. 3, 2009

(65) Prior Publication Data

US 2011/0072810 A1 Mar. 31, 2011

(30) Foreign Application Priority Data

May 30, 2008 (JP) ................................ 2008-143410

(51) Int. Cl.
*F16D 31/02* (2006.01)

(52) U.S. Cl.
USPC .................................. 60/422; 60/452; 60/450

(58) Field of Classification Search
USPC ........... 60/428, 429, 430, 484, 486, 420, 422, 60/488, 452, 423, 450, 414
See application file for complete search history.

(56) References Cited

U.S. PATENT DOCUMENTS

| | | | | |
|---|---|---|---|---|
| 4,479,349 A * | 10/1984 | Westveer | ........................ | 60/420 |
| 5,046,309 A * | 9/1991 | Yoshino | .......................... | 60/445 |
| 5,277,027 A * | 1/1994 | Aoyagi et al. | .................. | 60/420 |
| 5,421,155 A * | 6/1995 | Hirata et al. | .................... | 60/426 |
| 5,575,148 A * | 11/1996 | Hirata et al. | .................... | 60/445 |
| 5,758,499 A * | 6/1998 | Sugiyama et al. | ............. | 60/450 |
| 5,794,439 A * | 8/1998 | Lisniansky | ...................... | 60/414 |
| 6,282,892 B1 * | 9/2001 | Arai | ............................... | 60/450 |
| 6,308,516 B1 * | 10/2001 | Kamada | .......................... | 60/450 |
| 6,688,102 B2 * | 2/2004 | Oka | ................................ | 60/422 |
| 6,976,358 B2 * | 12/2005 | Kim | ............................... | 60/452 |
| 7,458,211 B2 * | 12/2008 | Koo | ............................... | 60/452 |
| 7,565,801 B2 * | 7/2009 | Tozawa et al. | .................. | 60/414 |

FOREIGN PATENT DOCUMENTS

| | | | |
|---|---|---|---|
| JP | 2002-275945 A | | 9/2002 |
| JP | 2003-049810 A | | 2/2003 |
| JP | 2005-195102 A | | 7/2005 |
| WO | WO2006132031 | * | 12/2006 |

OTHER PUBLICATIONS

International Search Report: PCT/JP2009/058893.

* cited by examiner

*Primary Examiner* — Edward Look
*Assistant Examiner* — Michael Quandt
(74) *Attorney, Agent, or Firm* — Ladas & Parry LLP

(57) ABSTRACT

Disclosed is a controller of a hybrid, construction machine wherein electric power is generated by utilizing the standby flow rate of first and second main pumps, and the standby flow rate is converted into energy. Pilot channels are connected to the upstream side of on/off valves which are closed when first and second main pumps ensure a standby flow rate, and a controller unit judges that the first and second main pumps are discharging at the standby low rate based on pressure signals from first and second pressure sensors, and brings first and second solenoid valves to an open position.

6 Claims, 2 Drawing Sheets

CONTROLLER OF HYBRID CONSTRUCTION MACHINE

TECHNICAL FIELD

This invention relates to a controller of a hybrid construction machine using an electric motor as a drive source.

BACKGROUND

A hybrid structure in a construction machine such as a power shovel uses, for example, an excess output of an engine to rotate a generator for electric power generation. Then, the generated electric power is stored in a battery and the electric motor is driven by the electric power stored in the battery to actuate an actuator. Also, discharge energy from the actuator is used to rotate the generator for electric power generation. Then, similarly, the generated electric power is stored in the battery, and the electric motor is driven by the electric power of the battery for actuation of the actuator.

In a power shovel or the like, even when an actuator in a work mechanical system is stopped, the engine is maintained in a rotating state. In this event, since a pump rotates together with the engine, the pump discharges so-called standby flow rate.

[Patent Literature 1] JP-A 2002-275945

SUMMARY OF THE INVENTION

Technical Problem

In the controllers in the related art as described above, since a so-called standby flow rate discharged from a pump when an actuator of a work mechanical system is stopped is simply sent back to a tank, most of the standby flow rate disadvantageously causes a loss of energy.

It is an object of the present invention to provide a controller of a hybrid construction machine which is adapted to use a standby flow rate of a main pump to enable a power generation function in order to achieve energy regeneration.

Solution to Problem

A first invention provides a controller of a hybrid construction machine which is equipped with a variable displacement type of a main pump, a circuit system connected to the main pump and including a plurality of operated valves, a neutral channel guiding discharge oil of the main pump toward a tank when all the operated valves provided in the circuit system are maintained in a neutral position, a throttle provided in a portion of the neutral channel downstream of a most-downstream operated valve of the operated valves for generating a pilot pressure, a pilot channel guiding a pressure generated between the most-downstream operated valve and the throttle, a regulator connected to the pilot channel and controlling a tilting angle of the main pump, and a pressure sensor detecting a pressure in the pilot channel. The controller of a hybrid construction machine comprises an on/off valve that is provided in a portion of the neutral channel between the most-downstream operated valve and a throttle for generating a pilot pressure, and is maintained in an open position under normal conditions and switched to a closed position when a pilot pressure in the pilot channel reaches a set pressure or higher and the main pump ensures a standby flow rate; a variable displacement type of a sub-pump connected to a discharge of the main pump; an electric motor for rotating the sub-pump; an assist hydraulic motor that rotates the electric motor; a solenoid valve that is provided in a connection process between the main pump and the assist hydraulic motor and performs closing/opening operation; and a controller unit. The pilot channel is connected to an upstream side of the on/off valve. The controller unit closes the on/off valve and switches the solenoid valve to an open position when determining, based on a pressure signal from the pressure sensor, that the main pump is discharging a standby flow rate.

A second invention provides the controller in which the main pump and the solenoid valve are connected to each other through a standby channel, and the standby channel is connected to a connection process between the main pump and a most-upstream operated valve of the operated valves.

A third invention provides the controller in which the sub-pump, the assist hydraulic motor and the electric motor rotate coaxially, and the electric motor has a function as a generator.

A fourth invention provides the controller in which oil discharged from or supplied to an actuator can be introduced into the assist hydraulic motor.

Advantageous Effects of Invention

According to the first invention, the standby flow rate uselessly discharged in the related art can be regenerated as energy of power generation, thus achieving energy conservation.

According to the second invention, the loss of pressure of the fluid guided to a standby channel can be reduced.

According to the third invention, the electric motor can be also used as a generator, thus simplifying the entire structure.

According to the fourth invention, since a part of the oil discharged from or supplied to an actuator can be introduced to the assist hydraulic motor, even while the actuator is operated, the power generation function can be fulfilled.

DESCRIPTION OF EMBODIMENTS

FIG. 1 illustrates a controller of a power shovel according to a first embodiment, which includes a variable displacement type of first and second main pumps MP1, MP2 which drive an engine E. The first and second main pumps MP1, MP2 rotate coaxially. Note that reference numeral 1 denotes a generator which is mounted on the engine E and uses the surplus power of the engine to implement the function of generating electric power.

The first main pump MP1 is connected to a first circuit system S1. To the first circuit system S1 are connected, in order of upstream toward downstream, a operated valve 2 for controlling a rotation motor RM, an operated valve 3 for controlling an arm cylinder (not shown), a boom-in-second-gear operated valve 4 for controlling a boom cylinder BC, an auxiliary operated valve 5 for controlling an auxiliary attachment (not shown), and a first travel-motor operated valve 6 for controlling a first travel motor for left traveling (not shown).

Each of the operated valves 2 to 6 is connected to the first main pump MP1 via a neutral channel 7 and a parallel passage 8.

A throttle 9 is disposed on the neutral channel 7 downstream of the first travel-motor operated valve 6 and generates a pilot pressure. The throttle 9 generates a higher pilot pressure on the upstream side of the throttle 9 with a higher rate of flow passing through the throttle 9, and a lower pilot pressure with a lower rate of flow.

When all the operated valves 2 to 6 are in or near the neutral position, the neutral channel 7 guides all or part of the oil discharged from the first main pump MP1 to a tank T. At this condition, the rate of flow passing through the throttle 9 is increased, so that a high pilot pressure is generated as described above.

On the other hand, when switching the operated valves 2 to 6 in a full stroke position, the neutral channel 7 is closed to block the flow of fluid. In this case, accordingly, the rate of flow passing through the throttle 9 is almost zero, which means that a pilot pressure of zero is kept.

However, depending on manipulated variables of the operated valves 2 to 6, a portion of the pump discharge flow is directed to an actuator and another portion is directed from the neutral channel 7 to the tank. As a result, the throttle 9 generates a pilot pressure in accordance with the rate of flow passing through the neutral channel 7. In other words, the throttle 9 generates a pilot pressure in accordance with the manipulated variables of the operated valves 2 to 6.

An on/off valve 10 is mounted in the neutral channel 7 and between the most-downstream operated valve 6 and the throttle 9. The on/off valve 10 has a solenoid 10*a* connected to a controller unit C. In other words, the on/off valve 10 is opened/closed in response to a command from the controller unit C. When being in a normal position, the on/off valve 10 is maintained in a full open state by a spring force of a spring 10*b*. Upon excitation of the solenoid 10*a*, the on/off valve 10 is switched against a spring force of the spring 10*b* and maintained in a closed state.

A pilot channel 11 is connected to a point of the neutral channel 7 between the operated valve 6 and the on/off valve 10. The pilot channel 11 is connected to a regulator 12 which controls the tilting angle of the first main pump MP1.

The regulator 12 controls the discharge rate of the first main pump MP1 in inverse proportion to the pilot pressure. Accordingly, when the operated valves 2 to 6 are fully stroked and then the flow rate in the neutral channel 7 changes to zero to reduce the pilot pressure to zero, the discharge rate of the first main pump MP1 is maintained at maximum.

A first pressure sensor 13 is connected to the pilot channel 11 configured as described above, and detects a pressure signal which is then applied to the controller unit C. The pilot pressure in the pilot channel 11 varies in accordance with the manipulated variable of the operated valve. As a result, the pressure signal detected by the first pressure sensor 13 is proportional to the flowrate required by the first circuit system S1.

When the pressure signal from the first pressure sensor 13 reaches a set pressure, the controller unit C energizes the solenoid 10*a* to switch the on/off valve 10 to the closed position. Timing of such switching of the on/off valve 10 to the closed position is the time when the operated valves 2 to 6 are maintained around the neutral position and the pressure in the upstream side of the throttle 9 builds up to a set pressure. The controller unit C previously stores the set pressure. When the on/off valve 10 is switched to the closed position as described above, the pressure in the pilot channel 11 still acts on the regulator 12, so that the first main pump MP1 is maintained at a required tilting angle. As a result, the first main pump MP1 is allowed to ensure a standby flow rate.

Upon switching of any of the operated valves 2 to 6, a signal pressure of the pressure sensor 13 is reduced. Then, when the signal pressure is reduced to a preset pressure, the controller unit C de-energizes the solenoid 10*a* so that the on/off valve 10 returns to the open position by a spring force of the spring 10*b*. Also, the controller unit C de-energizes the solenoid valve 58 to close the passages 55, 57.

On the other hand, the second main pump MP2 is connected to a second circuit system S2. To the second circuit system are connected, in order of upstream toward downstream, an operated valve 14 for controlling a second travel motor for right traveling (not shown), an operated valve 15 for controlling a bucket cylinder (not shown), an operated valve 16 for controlling the boom cylinder BC, and an arm-in-second-gear operated valve 17 for controlling the arm cylinder (not shown). Note that the operated valve 16 is provided with a sensor for detecting a manipulated direction and a manipulated variable of the operated valve 16, and the manipulation signal is transmitted to the controller unit C.

Each of the operated valves 14 to 17 is connected to the second main pump MP2 through the neutral channel 18. The operated valve 15 and the operated valve 16 are connected to the second main pump MP2 through a parallel passage 19.

A throttle 20 is provided in the neutral channel 18 downstream of the operated valve 17. The throttle 20 is exactly identical in function with the throttle 9 in the first circuit system S1.

An on/off valve 21 is provided in the neutral channel 18 between the most downstream operated valve 17 and the throttle 20. The on/off valve 21 is structured similarly to the on/off valve 10 in the first circuit system S1. Specifically, the on/off valve 21 has a solenoid 21*a* connected to the controller unit C, and opens/closes in response to an instruction from the controller unit C. When in the normal position, the on/off valve 21 is maintained in the full open state by a spring force of a spring 21*b*. Upon energization of the solenoid 21*a*, the on/off valve 21 is switched against the spring force of the spring and maintained in the closed position.

A pilot channel 22 is connected to a portion of the neutral channel 18 between the operated valve 17 and the on/off valve 21, and also connected to a regulator 23 for controlling the tilting angle of the second main pump MP2.

The regulator 23 controls the discharge rate of the second main pump MP2 in inverse proportion to the pilot pressure. Accordingly, when the operated valves 14 to 17 are fully stroked so that the flow rate in the neutral channel 18 changes to zero and the pilot pressure becomes zero, a maximum discharge rate of the second main pump MP2 is maintained.

A second pressure sensor 24 is connected to the pilot channel 22 configured as described above, and detects a pressure signal which is then transmitted to the controller unit C. The pilot pressure in the pilot channel 22 varies in accordance with the manipulated variable of the operated valve. As a result, the pressure signal detected by the second pressure sensor 24 is proportional to the flowrate required by the second circuit system S2.

When the pressure signal from the second pressure sensor 24 reaches a set pressure, the controller unit C energizes the solenoid 21*a* to switch the on/off valve 21 to the closed position. Timing of such switching of the on/off valve 21 to the closed position is the time when the operated valves 14 to 17 are maintained around the neutral position and the pressure in the upstream side of the throttle 20 builds up to a set pressure. The controller unit C previously stores the set pressure. When the on/off valve 21 is switched to the closed position as described above, the pressure in the pilot channel 22 at this time acts on the regulator 23, so that the second main pump MP2 is maintained at a required tilting angle. As a result, the second main pump MP2 is allowed to ensure a standby flow rate.

Upon switching of any of the operated valves 14 to 17, a signal pressure of the pressure sensor 24 is reduced. Then, when the signal pressure is reduced to a preset pressure, the controller unit C de-energizes the solenoid 21*a* so that the on/off valve 21 returns to the open position by a spring force of the spring 21. Also, the controller unit C de-energizes the solenoid valve 59 to close the passages 56, 57.

A generator 1 provided in the engine E is connected to a battery charger 25. The electric power generated by the generator 1 is supplied through the battery charger 25 to a battery 26.

The battery charger 25 is adapted to charge the battery 26 even when it is connected to a usual household power source 27. That is, the battery charger 25 is connectable to an independent power source other than the controller.

On the other hand, an actuator port of the rotation-motor operated valve 2 connected to the first circuit system S1 is connected to passages 28, 29 which communicate with the rotation motor RM. Brake valves 30, 31 are respectively connected to the passages 28, 29. When the rotation motor operated valve 2 is kept in its neutral position, the actuator port is closed, so that the rotation motor RM maintains its stop state.

Upon switching of the rotation-motor operated valve 2 from this position in either direction, one passage 28 of the passages 28, 29 is connected to the first main pump MP1, while the other passage 29 is connected to the tank. As a result, pressure oil is supplied through the passage 28 to rotate the rotation motor RM, while the return oil flows from the rotation motor RM through the passage 29 back to the tank.

On the other hand, when the rotation-motor operated valve 2 is switched in the direction opposite to the above-described direction, the pump discharge oil flows into the passage 29, while the passage 28 is connected to the tank, so that the rotation motor RM rotates in the opposite direction.

In this manner, during the operation of the rotation motor RM, the brake valve 30 or 31 functions as a relief valve. Then, when the pressure in the passage 28, 29 becomes a set pressure or higher, the brake valve 30, 31 is opened to maintain the pressure in the passage 28, 29 at the set pressure. When the rotation-motor operated valve 2 is moved back to the neutral position while the rotation motor RM is rotating, the actuator port of the operated valve 2 is closed. Even when the actuator port of the operated valve 2 is closed in this manner, the rotation motor RM continues to rotate by its inertial energy. By rotating by its inertial energy, the rotation motor RM acts as a pump. At this stage, the passages 28, 29, the rotation motor RM and the brake valve 30 or 31 form a closed circuit. The brake valve 30 or 31 converts the inertial energy to thermal energy.

On the other hand, upon switching of the operated valve 16 is switched from the neutral position in either direction, the pressure oil fluid flowing from the second main pump MP2 is supplied through a passage 32 to a piston chamber 33 of the boom cylinder BC, and the return oil flows from a rod chamber 34 of the boom cylinder BC through a passage 35 to the tank, resulting in extension of the boom cylinder BC.

In contrary, upon switching of the operated valve 16 in the direction opposite to the above-described direction, a pressure oil flowing from the second main pump MP2 is supplied through the passage 35 to the rod chamber 34 of the boom cylinder BC, while the return fluid flows from the piston chamber 33 through the passage 32 back to the tank, resulting in contraction of the boom cylinder BC. Note that the boom-in-second-gear operated valve 3 is switched in conjunction with the operated valve 16.

A proportional solenoid valve 36, the degree of opening of which is controlled by the controller unit C, is provided in the passage 32 connected between the piston chamber 33 of the boom cylinder BC and the operated valve 16 as described above. Note that the proportional solenoid valve 36 is kept in the full open position when it is in its normal state.

Next, a variable displacement sub-pump SP for assisting in the output of the first, second main pump MP1, MP2 will be described.

The variable displacement sub-pump SP rotates by a drive force of an electric motor MG also serving as a generator, and a variable displacement assist hydraulic motor AM also rotates coaxially by the drive force of the electric motor MG. The electric motor MG is connected to an inverter I which is connected to the battery 26. The inverter I is connected to the controller unit C. Thus, the controller unit C can control a rotational speed and the like of the electric motor MG.

Tilting angles of the sub pump SP and the assist hydraulic motor AM are controlled by tilt-angle control units 37, 38 which are controlled through output signals of the controller unit C.

The sub-pump SP is connected to a discharge passage 39. The discharge passage 39 is divided into two channels, a first assist channel 40 that merges with the discharge side of the first main pump MP1 and a second assist channel 41 that merges with the discharge side of the second main pump MP2. The first, second assist channels 40, 41 are respectively provided with first, second solenoid proportional throttling valves 42, 43 the degrees of openings of which are controlled by signals output from the controller unit C.

Note that reference numerals 44, 45 in FIG. 1 denote check valves fitted in the first, second assist channels 40, 41. The check valves 44, 45 permit the fluid to flow from the sub pump SP to the first, second main pumps MP1, MP2 only.

On the other hand, the assist hydraulic motor AM is connected to a connection passage 46. The connection passage 46 is connected through the guiding passage 47 and check valves 48, 49 to the passages 28, 29 which are connected to the rotation motor RM. In addition, a solenoid directional control valve 50, the opening/closing of which is controlled by the controller unit C, is provided in the guiding passage 47. A pressure sensor 51 is disposed between the solenoid directional control valve 50 and the check valves 48, 49 for detecting a pressure of the rotation motor RM in the turning operation or a pressure of it in the braking operation. A pressure signal of the pressure sensor 51 is applied to the controller unit C.

A pressure relief valve 52 is provided in the guiding passage 47 downstream from the solenoid directional control valve 50 for the flow from the rotation motor RM to the connection passage 46. The pressure relief valve 52 maintains the pressure in the passages 28, 29 to prevent so called run-away of the rotation motor RM in the event of a failure occurring in the system of the passage 46, for example, in the solenoid directional control valve 50 or the like.

Another guiding passage 53 is provided between the boom cylinder BC and the proportional solenoid valve 36 and communicates with the connection passage 46. A solenoid on/off valve 54 controlled by the controller unit C is disposed in the guiding passage 53.

The assist hydraulic motor AM arranged as described above is also connected to the first, second main pumps MP1, MP2 over the following connection path. Specifically, the standby channels 55, 56 are respectively connected to the discharge sides of the first, second main pumps MP1. MP2 and upstream sides of the most-upstream operated valves 2, 14. The standby channels 55, 56 are connected through the merging passage 57 to the connection passage 46. Then, the first, second solenoid valves 58, 59 are respectively provided in the standby channels 55, 56. Each of the first, second solenoid valves 58, 59 is equipped with a spring 58*a*, 59*a* at one end and a solenoid 58*b*, 59*b* at the other end, and the solenoid 58*b*, 59*b* is connected to the controller unit C. The first, second solenoid valve 58, 59 is usually maintained in the closed position by the spring force of the spring 58*a*, 59*a*, and switched to the open position at the time when the solenoid 58*b*, 59*b* are energized by a signal from the controlled.

For the purpose of reducing the pressure loss in the fluid introduced into the standby channel 55, 56, the standby channel 55, 56 is connected to a point on the discharge side of the first, second main pump MP1, MP2 and upstream of the most-upstream operated valve 2, 14.

Note that reference numeral 60 denotes a check valve provided in the merging passage 57 for directing the pressure oil flowing from the first, second solenoid valves 58, 59 and the standby cannels 55, 56 toward the connection passage 46.

The operation according to the first embodiment will be described below.

When the operated valves 2 to 6, 14 to 17 in each of the first, second circuit systems S1, S2 are kept in their neutral positions now, the total amount of oil discharged from the first, second main pump MP1, MP2 is introduced from the neutral channel 7, 18 through the throttle 9, 20 to the tank. When the total amount of pump discharge fluid is directed through the throttle 9, 20 to the tank in this manner, the pressure in the upstream side of the throttle 9, 20 builds up, and the pressure at this time is directed through the pilot channel 11, 22 to the regulator 12, 23. As a result, by action of the pilot pressure thus building up, the regulator 12, 23 reduces the tilting angle of the first, second main pump MP1, MP2, thus maintaining the standby flow rate.

Then, the pilot pressure in the pilot channel 11, 22 reaches a set pressure, the controller unit C detects the pressure by receiving a pressure signal from the first, second pressure sensor 13, 24, and switches the on/off valve 10, 21 to the closed position. Even when the on/off valve 10, 21 is switched to the closed position, the pressure in the pilot channel 11, 22 acts on the regulator 12, 23, so that the first, second main pump MP1, MP2 discharge a standby flow. Also, at this time, the controller unit C energizes the solenoid 58*b*, 59*b* of the first, second solenoid valve 58, 59 so that the solenoid valve is switched from the closed position to the open position.

The standby flow discharged from the first, second main pump MP1, MP2 is supplied to the assist hydraulic motor AM through the standby channel 55, 56, the first, second solenoid valve 58, 59, the merging passage 57 and the check valve 60.

For introducing the standby flows of the first, second main pumps MP1, MP2 to the assist hydraulic motor AM as described above, the controller unit C operates the tilting angle control unit 38 to maintain the tilting angle of the assist hydraulic motor AM to a pre-stored set tilting angle, and the tilting angle control unit 37 to set the tilting angle of the sub pump SP to zero, and maintains the electric motor MG in a regenerative state through the inverter I.

Accordingly, the electric motor/generator MG fulfills an electric generation function when rotated by a drive force of the assist hydraulic motor AM. That is, in the first embodiment, the electric motor MG is operated to exercise a function as a generator by use of the standby flows of the first, second main pumps MP1, MP2. The electric power thus generated is stored in the battery 26 and the electric power stored in the battery 26 can be used as a power source for the electric motor MG.

The above description has been given on the assumption that all the operated valves 2 to 6, 14 to 17 of both the first and second circuit systems S1, S2 are maintained in the neutral position, but when the operated valves 2 to 6 or the operated valves 14 to 17 of either the first circuit system S1 or the second circuit system S2 are in the neutral position, the assist hydraulic motor AM is also rotated by the standby flow. In this case, the controller unit C switches either the solenoid valve 58 or 59 to the open position on the basis of a pressure signal from the corresponding pressure sensor 13 or 24, and maintains the other solenoid valve 59 or 58 in the closed position. Accordingly, the pump standby flow of one of the first and second main pumps MP1, MP2 is supplied to the assist hydraulic motor AM, and the torque of the assist hydraulic motor AM causes the electric motor MG to fulfill the power generation function.

Next, the use of an assist force of the sub-pump SP will be described. In the first embodiment, an assist flow for the sub-pump SP is pre-set. Within the range of the pre-set assist flow, the controller unit C determines how to most efficiently control the tilting angle of the sub-pump SP, the tilting angle of the assist hydraulic motor AM, the rotational speed of the electric motor MG and the like, and perform control on each of them.

When switching an operated valve in either the first circuit system S1 or the second circuit system S2, if the on/off valves 10, 21 are in the closed position, the controller unit C switches the on/off valves 10, 21 to the open position. If the on/off valves 10, 21 are maintained in the open position, the pilot pressures in the pilot channels 11, 22 are reduced. Then, the signals representative of the reduced pilot pressures are transmitted to the controller unit C through the first, second sensors 13, 24, and the controller unit C switches the first, second solenoid valves 58, 59 to the closed position illustrated in FIG. 1. As a result, the first, second main pumps MP1, MP2 increases the discharge rate with a reduction in pilot pressure, and the total amount of discharge is supplied to the actuators connected to the first, second circuit systems S1, S2.

When the discharge rate from the first main pump MP1 or the second main pump MP2 is increased as described above, the controller unit C maintains the electric motor MG in the state of rotation at all times. The drive source of the electric motor MG is the electric power stored in the battery 26. In this regard, part of this electric power has been stored by use of the standby flow of the first, second main pump MP1, MP2 as described earlier, thus enhanced energy efficiency.

If the sub-pump SP is rotated by the drive force of the electric motor MG, the sub-pump SP discharges an assist flow. The controller unit C controls the degrees of openings of the first, second proportional solenoid throttling valves 42, 43 in response to the pressure signals from the first, second pressure sensors 13, 24, to proportionally divide the discharge flow of the sub-pump SP for delivery to the first, second circuit systems S1, S2.

On the other hand, if the rotation-motor operated valve 2 is switched, for example, in one of the opposite directions in order to drive the rotation motor RM connected to the first circuit system S1, the passage 28 communicates with the first main pump MP1, while the other passage 29 communicates with the tank, thus rotating the rotation motor RM. The turning pressure at this time is maintained at a set pressure of the brake valve 30. If the operated valve 2 is switched in the other direction, the passage 29 communicates with the first main pump MP1, while the passage 28 communicates with the tank, thus rotating the rotation motor RM. The turning pressure at this time is also maintained at a set pressure of the brake valve 31.

If the rotation-motor operated valve 2 is switched to the neutral position during the rotation operation of the rotation motor RM, a closed circuit is constituted between the passages 28, 29 as described earlier, and the brake valve 30 or 31 keeps the brake pressure in the closed circuit for conversion of inertial energy to thermal energy.

The pressure sensor 51 detects the turning pressure or the brake pressure and applies a signal indicative of the detected pressure to the controller unit C. When the detected pressure is lower than the set pressure of brake valve 30, 31 within a range of it having no influence on the turning operation of the rotation motor RM or the braking operation, the controller unit C switches the solenoid directional control valve 50 from the closed position to the open position. By thus switching the solenoid directional control valve 50 to the open position, the pressure oil introduced into the rotation motor RM flows into the guiding passage 47 and then through the pressure relief valve 52 and the connection passage 46 into the assist hydraulic motor AM.

At this stage, the controller unit C controls the tilting angle of the assist hydraulic motor AM in response to the pressure signal from the pressure sensor 51 as follows.

Specifically, if the pressure in the passage 28 or 29 is not maintained at a level required for the turning operation or the braking operation, the rotation motor RM cannot be rotated or braked For this reason, in order to maintain the pressure in the passage 28 or 29 to be equal to the turning pressure or the brake pressure, the controller unit C controls the load on the rotation motor RM while controlling the tilting angle of the assist hydraulic motor AM. Specifically, the controller unit C controls the tilting angle of the assist hydraulic motor AM such that the pressure detected by the pressure sensor 51 becomes approximately equal to the turning pressure of the rotation motor RM or the brake pressure.

If the assist hydraulic motor AM obtains a torque as described above, then the torque acts on the electric motor MG which rotates coaxially with the assist hydraulic motor AM. In this regard, the torque of the assist hydraulic motor AM acts as an assist force intended to the electric motor MG. This makes it possible to reduce the power consumption of the electric motor MG by an amount of power corresponding to the torque of the assist hydraulic motor AM.

The torque of the assist hydraulic motor AM may be used to assist the torque of the sub-pump SP. In this event, the assist hydraulic motor AM and the sub-pump SP are combined with each other to fulfill the pressure conversion function.

That is, the pressure flowing into the connection passage 46 is often lower than the pump discharge pressure. For the purpose of using the low pressure to maintain a high discharge pressure of the sub-pump SP, the assist hydraulic motor AM and the sub-pump SP are adapted to fulfill the booster function.

Specifically, the output of the assist hydraulic motor AM depends on a product of a displacement volume $Q_1$ per rotation and the pressure $P_1$ at this time. Likewise, the output of the sub-pump SP depends on a product of a displacement volume $Q_2$ per rotation and the discharge pressure $P_2$. In the embodiment, since the assist hydraulic motor AM and the sub-pump SP rotate coaxially, equation $Q_1 \times P_1 = Q_2 \times P_2$ must be established. For this purpose, for example, assuming that the displacement volume $Q_1$ of the assist hydraulic motor AM is three times as high as the displacement volume $Q_2$ of the sub-pump SP, that is, $Q_1 = 3Q_2$, the equation $Q_1 \times P_1 = Q_2 x P_2$ results in $3Q_2 \times P_1 = Q_2 \times P_2$. Dividing both sides of this equation by $Q_2$ gives $3P_1 = P_2$.

Accordingly, if the tilting angle of the sub-pump SP is changed to control the displacement volume $Q_2$, a predetermined discharge pressure of the sub-pump SP can be maintained using the output of the assist hydraulic motor AM. In other words, the hydraulic pressure from the rotation motor RM can be built up and then discharged from the sub-pump SP.

In this regard, the tilting angle of the assist hydraulic motor AM is controlled such that the pressure in the passage 28, 29 is maintained to be equal to the turning pressure or the brake pressure as described earlier. For this reason, in the case of using the pressure oil from the rotation motor RM, the tilting angle of the assist hydraulic motor AM is logically determined. After the tilting angle of the assist hydraulic motor AM has been determined in this manner, the tilting angle of the sub-pump SP is controlled in order to fulfill the aforementioned pressure conversion function.

If the pressure in the system of the passage 46 is reduced below the turning pressure or the brake pressure for any reasons, the controller unit C closes the solenoid directional control valve 50 on the basis of the pressure signal sent from the pressure sensor 51 such that the rotation motor RM is not affected.

When a pressure-oil leak occurs in the connection passage 46, the pressure relief valve 52 operates to prevent the pressure in the passage 28, 29 from reducing more than necessary, thus preventing runaway of the rotation motor RM.

Next, a description will be given of control for the boom cylinder BC.

Upon switching of the operated valve 16 in order to actuate the boom cylinder BC, a sensor (not shown) provided in the operated valve 16 detects the manipulated direction and the manipulated variable of the operated valve 16, and sends the manipulation signal to the controller unit C.

The controller unit C determines in response to the manipulation signal of the sensor whether the operator is about to move up or down the boom cylinder BC. If the controller unit C receives a signal representative of moving-up of the boom cylinder BC, the controller unit C maintains the proportional solenoid valve 36 in the normal state. In other words, the proportional solenoid valve 36 is kept in the full-open position. At this time, the controller unit C keeps the solenoid on/off valve 54 in the closed position which is not shown and controls the rotational speed of the electric motor MG and the tilting angle of the sub-pump SP.

On the other hand, if the controller unit C receives the signal representative of moving-down of the boom cylinder BC from the sensor, the controller unit C calculates a moving-down speed of the boom cylinder BC desired by the operator in accordance with the manipulated variable of the operated valve 16, and closes the proportional solenoid valve 36 and switches the solenoid on/off valve 54 to the open position.

By closing the proportional solenoid valve 36 and switching the solenoid on/off valve 54 to the open position as described above, the total amount of oil returning from the boom cylinder BC is supplied to the assist hydraulic motor AM. However, if the flow rate consumed by the assist hydraulic motor AM is lower than the flow rate required for maintaining the moving-down speed desired by the operator, the boom cylinder BC cannot maintains the moving-down speed desired by the operator. In this event, the controller unit C controls, based on the manipulated variable of the operated valve 16, the tilting angle of the assist hydraulic motor AM, the rotational speed of the electric motor MG and the like, the degree of opening of the proportional solenoid valve 36 to direct a greater flow rate than that consumed by the assist hydraulic motor AM back to the tank, thus maintaining the moving-down speed of the boom cylinder BC desired by the operator.

On the other hand, upon the pressure oil being supplied to the assist hydraulic motor AM, the assist hydraulic motor AM rotates and this torque acts on the electric motor MG which rotates coaxially. The torque of the assist hydraulic motor AM acts as an assist force intended to the electric motor MG.

Thus, the power consumption can be reduced by an amount of power corresponding to the torque of the assist hydraulic motor AM.

In this regard, the sub-pump SP can be rotated using only a torque of the assist hydraulic motor AM without a power supply to the electric motor MG. In this case, the assist hydraulic motor AM and the sub-pump SP fulfill the pressure conversion function as in the aforementioned case.

Next, the simultaneous actuation of the rotation motor RM for the turning operation and the boom cylinder BC for the moving-down operation will be described.

When the boom cylinder BC is moved down during the rotation of the rotation motor RM, the pressure oil from the rotation motor RM and the return oil from the boom cylinder BC join in the connection passage 46 and flow into the assist hydraulic motor AM.

In this regard, if the pressure in the connection passage 46 rises, the pressure in the guiding passage 47 also rises with this pressure rise. Even if the pressure in the guiding passage 47 exceeds the turning pressure or the brake pressure of the rotation motor RM, it has no influence on the rotation motor RM because the check valves 48, 49 are provided.

If the pressure in the connection passage 46 reduces lower than the turning pressure or the brake pressure as described earlier, the controller unit C closes the solenoid directional control valve 50 on the basis of a pressure signal from the pressure sensor 51.

Accordingly, when the turning operation of the rotation motor RM and the moving-down operation of the boom cylinder BC are simultaneously performed as described above, the tilting angle of the assist hydraulic motor AM may be determined with reference to the required moving-down speed of the boom cylinder BC irrespective of the turning pressure or the brake pressure.

At all events, the output of the assist hydraulic motor AM can be used to assist the output of the sub-pump SP, and also the flow rate discharged from the sub-pump SP can be proportionally divided at the first, second proportional solenoid throttling valves 42, 43 for delivery to the first, second circuit systems S1, S2.

On the other hand, for use of the assist hydraulic motor AM as a drive source and the electric motor MG as a generator, the tilting angle of the sub-pump SP is changed to zero such that the sub-pump SP is put under approximately no-load conditions, and the assist hydraulic motor AM is maintained to produce an output required for rotating the electric motor MG. By doing so, the output of the assist hydraulic motor AM can be used to allow the electric motor MG to fulfill the generator function.

In the embodiment, the output of the engine E can be used to allow the generator 1 to generate electric power or the assist hydraulic motor AM can be used to allow the electric motor MG to generate electric power. Then, the electric power thus generated is stored in the battery 26. In the embodiment, since the household power source 27 may be used to accumulate electric power in the battery 26, the electric power of the electric motor MG can be utilized for various components.

Since the check valves 44, 45 are provided and the solenoid directional control valve 50 and the solenoid on/off valve 54 or the first, second solenoid valves 58, 59 are provided, for example, when a failure occurs in the system of the sub-pump SP and the assist hydraulic motor AM, the system of the first, second main pumps MP1, MP2 can be hydraulically disconnected from the system of the sub-pump SP and the assist hydraulic motor AM. In particular, the solenoid directional control valve 50, the solenoid on/off valve 54 and the first, second solenoid valves 58, 59, which are in the normal conditions, are maintained in the closed position by a spring force of the springs as illustrated in the drawings, and also the proportional solenoid valve 36 is kept in the normal position which is the full open position. For this reason, even if a failure occurs in the electric system, the system of the first, second main pumps MP1, MP2 can be hydraulically disconnected from the system of the sub-pump SP and the assist hydraulic motor AM as described above.

FIG. 2 illustrates a second embodiment employing a solenoid valve 61 which is formed by combining together the first, second solenoid valves 58, 59 described in the first embodiment. Specifically, the standby channels 55, 56, which are respectively connected to the first, second main pumps MP1, MP2, are connected to one solenoid valve 61. The solenoid valve 61 has a spring 61*a* mounted at one end and a solenoid 61*b* mounted at the other end. The solenoid 61*b* is connected to the controller unit C. The solenoid valve 61 maintains in the closed position as illustrated in FIG. 2 under normal conditions by a spring force of the spring 61*a* so as to block the communication between the two standby channels 55, 56 and the merging passage 57.

The solenoid 61*b* is energized by a signal from the controller unit C, so that the solenoid valve 61 is switched from the closed position to the open position. Timing of this switching is the time when pressure signals of the respective pressure sensors 13, 24 builds up, so that the on/off valves 10, 21 are closed. If the solenoid valve 61 is switched from the closed position to the open position in this manner, both the standby channels 55, 56 simultaneously communicate with the merging passage 57.

In the second embodiment configured as described above, only when all the operated valves 2 to 6 and 14 to 17 of both the circuit systems S1, S2 are maintained in the neutral position, the standby flow of the first, second main pumps MP1, MP2 can be used to rotate the assist hydraulic motor AM, so that the electric motor MG can fulfill the power generation function.

The other structures and operations are similar to those in the first embodiment.

The on/off valves 10, 21 described in the first, second embodiments are on/off controlled, but may be adapted to be varied in the degree of opening in accordance with a control signal of the controller unit C.

The on/off valves 10, 21 are designed to close/open in response to a control signal from the controller unit C, but may be subjected to the opening/closing control using the pressure in the neutral channels 7, 18 as pilot pressure.

REFERENCE SIGNS LIST

Figure 1:
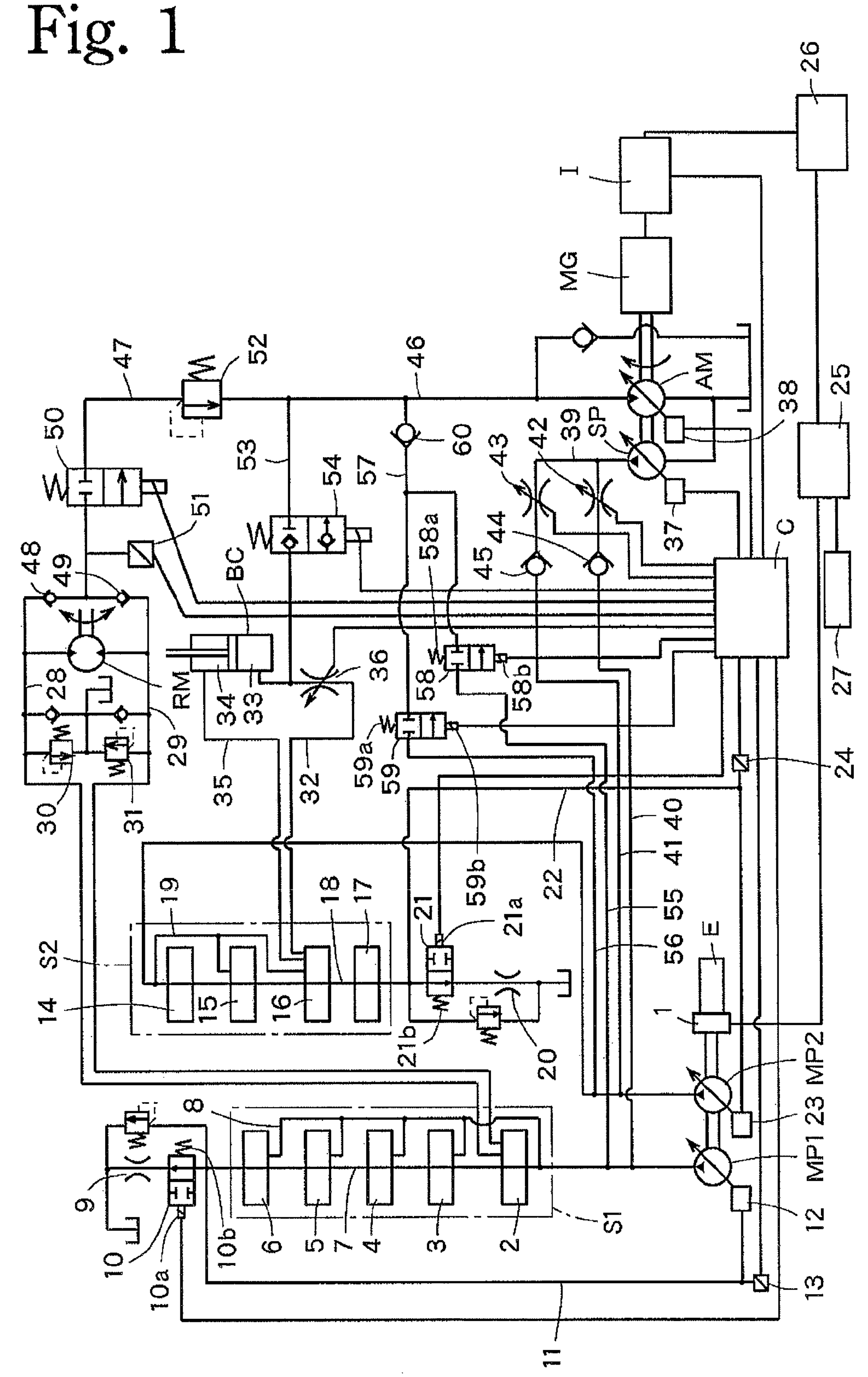
FIG. 1 is a circuit diagram illustrating a first embodiment.
Figure 2:
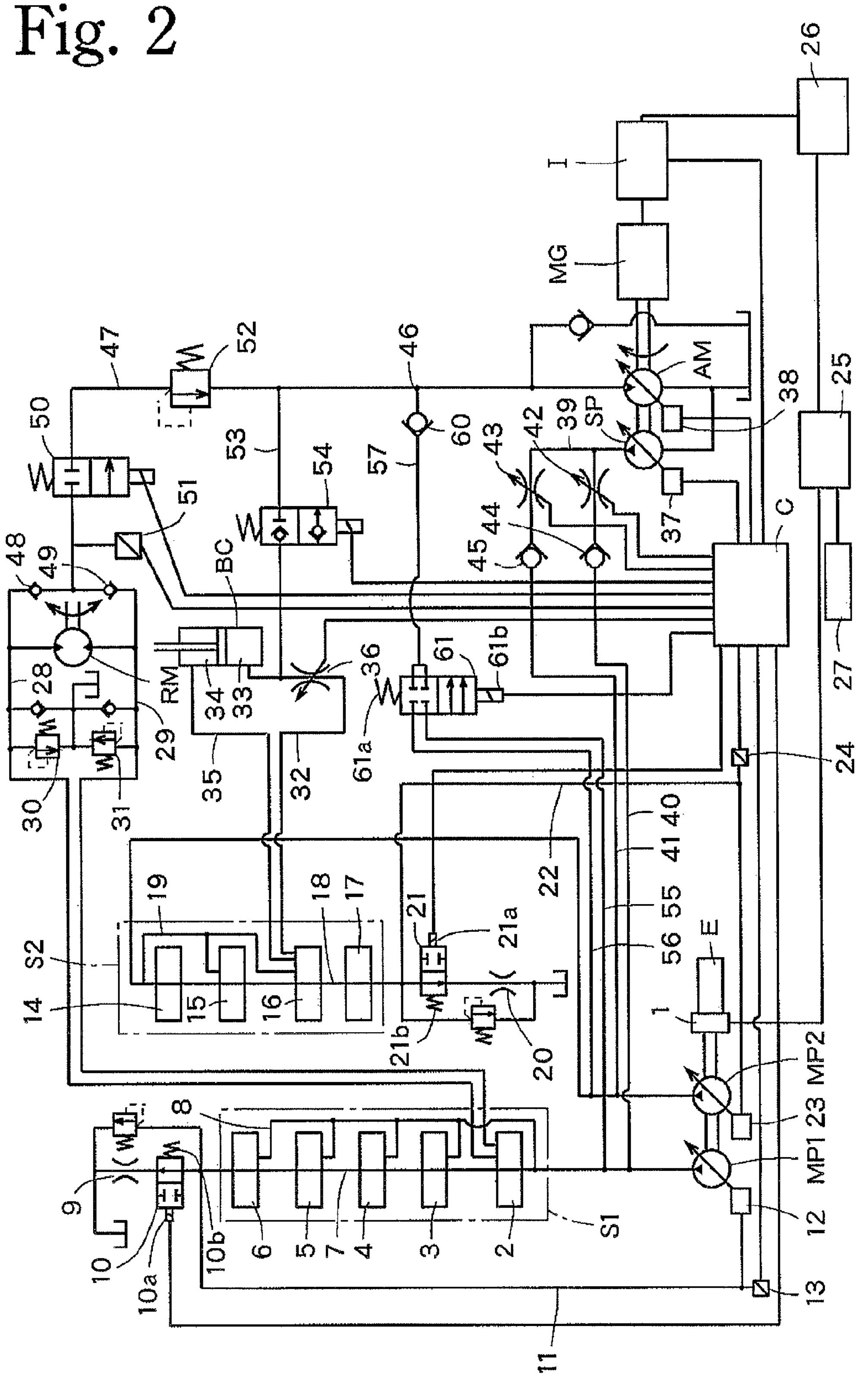
FIG. 2 is a circuit diagram illustrating a second embodiment.

MP1 First main pump
MP2 Second main pump
S1 First circuit system
S2 Second circuit system
2-6 Operated valve
10, 21 On/off valve
11, 22 Pilot channel
12, 23 Regulator
13 First pressure sensor
C Controller unit
14-17 Operated valve
24 Second pressure sensor
SP Sub-pump
AM Assist hydraulic motor MG Electric motor/generator
58 First solenoid valve
59 Second solenoid valve
61 Solenoid valve

The invention claimed is:

1. A controller of a hybrid construction machine, comprising:

a variable displacement type of a main pump, a circuit system connected to the main pump and comprising a plurality of operated valves, a neutral channel guiding discharge oil of the main pump toward a tank when all the operated valves provided in the circuit system are maintained in a neutral position, a throttle provided in a portion of the neutral channel downstream of a most-downstream operated valve of the operated valves for generating a pilot pressure, a pilot channel guiding a pressure generated between the most-downstream operated valve and the throttle, a regulator connected to the pilot channel and controlling a tilting angle of the main pump, and a pressure sensor detecting a pressure in the pilot channel, the controller of a hybrid construction machine, comprising:

an on/off valve that is provided in a portion of the neutral channel between the most-downstream operated valve and a throttle for generating a pilot pressure, and is maintained in an open position under normal conditions and switched to a closed position when a pilot pressure in the pilot channel reaches a set pressure or higher and the main pump ensures a standby flow rate;

a variable displacement type of a sub-pump connected to a discharge of the main pump;

an electric motor for rotating the sub-pump;

an assist hydraulic motor that rotates the electric motor;

a solenoid valve that is provided in a connection channel between the main pump and the assist hydraulic motor and performs closing/opening operation; and a controller unit, wherein the pilot channel is connected to an upstream side of the on/off valve, and the controller unit closes the on/off valve and switches the solenoid valve to an open position when determining, based on a pressure signal from the pressure sensor, that the main pump is discharging a standby flow rate.

2. The controller of a hybrid construction machine according to claim 1, wherein the main pump and the solenoid valve are connected to each other through a standby channel, and the standby channel is connected to a connection channel between the main pump and a most-upstream operated valve of the operated valves.

3. The controller of a hybrid construction machine according to claim 1, wherein the sub-pump, the assist hydraulic motor and the electric motor rotate coaxially, and the electric motor has a function as a generator.

4. The controller of a hybrid construction machine according to claim 1, wherein oil discharged from or supplied to an actuator can be introduced into the assist hydraulic motor.

5. The controller of a hybrid construction machine according to claim 2, wherein the sub-pump, the assist hydraulic motor and the electric motor rotate coaxially, and the electric motor has a function as a generator.

6. The controller of a hybrid construction machine according to claim 2, wherein oil discharged from or supplied to an actuator can be introduced into the assist hydraulic motor.

* * * * *